United States Patent [19]
Wright

[11] Patent Number: 5,591,380
[45] Date of Patent: *Jan. 7, 1997

[54] PREPARATION OF ALUMINA-SILICA SOL GEL COMPOSITIONS

[75] Inventor: Robert J. Wright, Tequesta, Fla.

[73] Assignee: United Technologies Corporation, Hartford, Conn.

[*] Notice: The term of this patent shall not extend beyond the expiration date of Pat. No. 5,324,544.

[21] Appl. No.: 437,486

[22] Filed: May 9, 1995

Related U.S. Application Data

[63] Continuation of Ser. No. 328,966, Oct. 24, 1994, abandoned, which is a continuation of Ser. No. 811,341, Dec. 20, 1991, abandoned.

[51] Int. Cl.$^6$ .................................................. B01J 13/00
[52] U.S. Cl. ................................ 252/313.1; 252/315.5; 501/12
[58] Field of Search .................. 252/313.2, 315.6, 252/315.7, 313.1, 315.5; 501/12

[56] References Cited

U.S. PATENT DOCUMENTS

| | | | |
|---|---|---|---|
| 2,656,321 | 10/1953 | Hunter et al. | 252/313.1 |
| 3,445,361 | 5/1969 | Sicka et al. | 204/181.4 |
| 3,476,691 | 11/1969 | Smith et al. | 252/313.1 |
| 3,947,340 | 3/1976 | Kawagoshi et al. | 204/181 |
| 4,181,532 | 1/1980 | Woodhead | 252/313.1 X |
| 4,279,725 | 7/1981 | Powers et al. | 204/181 |
| 4,286,024 | 8/1981 | Yoldas | 501/128 X |
| 4,297,246 | 10/1981 | Cairns et al. | 252/465 |
| 4,360,449 | 11/1982 | Oberlander et al. | 252/313 R |
| 4,532,072 | 7/1985 | Segal | 252/313.1 |
| 4,613,454 | 9/1986 | Keiser | 252/313.2 |
| 4,801,399 | 1/1989 | Clark et al. | 252/315.01 |
| 4,810,415 | 3/1989 | Winkelbauer et al. | 252/183.12 |
| 4,913,840 | 4/1990 | Evans et al. | 252/313.2 |
| 4,921,731 | 5/1990 | Clark et al. | 427/314 |
| 5,009,688 | 4/1991 | Nakanishi | 65/18.3 |
| 5,028,352 | 7/1991 | Hietala et al. | 252/315.6 |
| 5,045,514 | 9/1991 | Ismali et al. | 501/119 |
| 5,047,174 | 9/1991 | Sherif | 252/309 |
| 5,089,456 | 2/1992 | Maeda et al. | 501/119 |
| 5,302,265 | 4/1994 | Dalzell, Jr. et al. | 204/181.5 |
| 5,324,544 | 6/1994 | Spence et al. | 427/397.7 |
| 5,336,560 | 8/1994 | Spence et al. | 428/336 |
| 5,338,707 | 8/1994 | Inui et al. | 501/12 |

OTHER PUBLICATIONS

"Alumina Sol Preparation from Alkoxides", Yoldas, American Ceramic Society Bulletin vol. 54, No. 3 (1975) pp. 289–290.

Yoldas, Bulent E., "Alumina Sol Preparation from Alkoxides", vol. 54, No. 3 (1975) 2 pgs.

Chemical Abstracts, CA68(16); 72615f (1968), corresponding to Stoeber et al., "Controlled growth of monodisperse silica spheres in the micron size range", *J. Colloid Interface Sci.*, 26(1), 65–9 (1968).

A. K. Van Helden et al, "Preparation and Characterization of Spherical Monodisperse Silica Dispersions in Nonaqueous Solvents", *J. Colloid Interface Sci.*, 81(2)354–368(1981).

*Primary Examiner*—Richard D. Lovering
*Assistant Examiner*—Daniel S. Metzmaier

[57] ABSTRACT

A method is taught for the preparation of mixed metal oxide sols particularly suited for the deposition of protective mixed metal oxide coatings upon a substrate.

24 Claims, No Drawings

PREPARATION OF ALUMINA-SILICA SOL GEL COMPOSITIONS

The invention was made under a U.S. Government contract and the Government has fights herein.

This is a file wrapper continuation of U.S. Ser. No. 08/328,996, filed on Oct. 24, 1994 and now abandoned, which is a file wrapper continuation of U.S. Ser. No. 07/811,341, filed on Dec. 20, 1991, now abandoned.

TECHNICAL FIELD

The present invention relates to the general area of the application of ceramic materials to a substrate. More particularly, it relates to the preparation of sols of ceramic materials, and specifically to the preparation of sols for the deposition of mixtures of alumina and silica. The sols prepared by the process of the present invention are particularly suited for deposition on surfaces to provide a protective coating thereupon. When so utilized, the compositions prepared by the present invention provide even, dense, and uniform coatings, while avoiding the costly preparatory steps of prior art techniques for ceramic deposition on a substrate.

BACKGROUND ART

It is well known to apply coatings to the surface of a body so as to obtain surface properties which differ from those of the body. This may be done to achieve a variety of improvements, such as increased toughness, high temperature capability, wear resistance, and corrosion resistance. By providing surface coatings of the appropriate characteristics, it is possible to substantially lower the cost of an article built to specific property requirements. Ceramics have frequently been utilized to provide a surface coating over a less temperature resistant metallic article to permit use of that article in higher temperature environments. In addition, ceramic materials are frequently utilized to provide enhanced strength in metal matrix composites by inclusion in the form of powders, fibers, and whiskers. There is also a need for ceramic coated fibers for use in metal matrix composites, particularly those fibers coated with oxides, mixed oxides, or doped oxides, which coatings serve as diffusion or chemical barriers.

In the past, various processes have been used to deposit ceramic materials upon a substrate. These include the application of glazes, enamels, and coatings; hot-pressing materials at elevated pressure and temperature; and, vapor deposition processes such as evaporation, cathodic sputtering, chemical vapor deposition, flame spraying, and plasma spraying. In addition, electrophoresis has been attempted, as have other specialized techniques, with limited success in application.

For example, the enamelling industry has used the electrodeposition of ceramic materials for some time. In the application of a ceramic coating by this technique, a ceramic material is milled or ground to a small particulate or powder size, placed into suspension, and electrophoretically deposited on the substrate. Another traditional method is the deposition of a ceramic coating from a slurry made up of a powder in suspension, usually in an aqueous medium. A major problem with these techniques is that powder particle sizes below about 2 microns were difficult to obtain, thus limiting the quality of coatings produced.

Sol-gel technology has recently evolved as a source of very fine sub-micron ceramic particles of great uniformity. Such sol-gel technology comprises essentially the preparation of ceramics by low temperature hydrolysis and peptization of metal oxide precursors in solution, rather than by the sintering of compressed powders at high temperatures.

In the prior art, much attention has been given to the preparation of sols of metal oxides (actually metal hydroxides, in most cases) by hydrolysis and peptization of the corresponding metal alkoxide, such as aluminum sec-butoxide $[Al(OC_4H_9)_3]$, in water, with an acid peptizer such as hydrochloric acid, acetic acid, nitric acid, and the like. The hydrolysis of aluminum alkoxides is discussed in an article entitled "Alumina Sol Preparation from Alkoxides" by Yoldas, in American Ceramic Society Bulletin Vol. 54, No. 3 (1975), pages 289–290. This article teaches the hydrolysis of aluminum alkoxide precursor with a mole ratio of water:precursor of 100:1, followed by peptization at 90° with 0.07 moles of acid per mole of precursor. After gelling and drying, the dried gel is calcined to form alumina powder.

In U.S. Pat. No. 4,532,072, of Segal, an alumina sol is prepared by mixing cold water and aluminum alkoxide in stoichiometric ratio, allowing them to react to form a peptizable aluminum hydrate, and peptizing the hydrate with a peptizing agent in an aqueous medium to produce a sol of an aluminum compound.

In Clark et at, U.S. Pat. No. 4,801,399, a method for obtaining a metal oxide sol is taught whereby a metal alkoxide is hydrolysed in the presence of an excess of aqueous medium, and peptized in the presence of a metal salt, such as a nitrate, so as to obtain a particle size in the sol between 0.0001 micron and 10 microns.

In Clark et at, U.S. Pat. No. 4,921,731, a method is taught for ceramic coating a substrate by thermophoresis of sols of the type prepared by the method of U.S. Pat. No. 4,801,399. In addition, Clark et al, in abandoned U.S. patent application Ser. No. 06/84 1,089, filed Feb. 25, 1986, teach formation of ceramic coatings on a substrate, including filaments, ribbons, and wires, by electrophoresis of such sols. However, the examples of this application indicate that the coatings obtained using electrophoresis were uneven, cracked, and contained bubbles, and often peeled, flaked off, and/or pulled apart.

It is thus seen that a need exists for a method for the preparation of a sol which is suitable for the deposition of uniform ceramic coatings on a substrate.

SUMMARY OF THE INVENTION

In the pursuit of a method for the preparation of defect-free ceramic coatings, applicants have developed a method for the preparation of a novel mixed metal oxide sol which is particularly suited for use in a deposition process for the protection of metal substrates. This sol is especially suitable for the protection of fuel contacting elements of a gas turbine engine from carbon deposition or coking, or for the protection of such metals as titanium by providing a hydrogen barrier. However, it is noted that this sol is suitable for application to a wide variety of substrates.

It is an object of the present invention to provide a method for making a sol suitable for deposition on the surface of a metallic workpiece, or a filament, fiber tow, or wire. It is a further object of this invention to provide a method for the preparation of a sol which may be deposited on a metallic or non-metallic surface so as to provide a ceramic coated body. It is a still further object of this invention to produce a sol which may be utilized to obtain a highly uniform, dense, tenacious, defect-free ceramic coating of highly controllable thickness and properties.

The present invention provides a method for the preparation of a sol suitable for coating a substrate, said method comprising the steps of:

a. Preparing an alumina sol by combining, in specific ratios and order of addition, water, an aluminum organo-metallic compound, peptizer, and a vaporizable carrier, at specific temperatures and within specific time frames;

b. Preparing a silica sol by combining, in specific ratios and order of addition, water, alcohol, and a silicon organo-metallic compound, under specified conditions; and c. Combining the alumina sol and the silica sol in specified ratios to obtain an alumina-silica sol having the desired composition and properties.

For deposition upon various substrates, the ratio of alumina to silica may be widely varied. It has been found that effective coatings may be achieved using alumina to silica ratios of from about 10:1 to about 1:10, with a preferred range of from about 2 alumina to 1 silica to about 1 alumina to 2 silica. However, the most preferred ratio of alumina to silica appears to be from about 1.5:1 to about 1:1.5.

Both the alumina sol and the silica sol may be prepared from the corresponding organo-metallic compounds.

DETAILED DESCRIPTION OF THE INVENTION

The present invention comprises a method for the preparation of a sol specifically formulated for the purpose of providing a medium for the deposition of coatings of a mixture of alumina and silica on a surface subject to the deposition of carbon, or coking. In addition, the sol disclosed herein may be used to produce multi-layer coatings of ceramic, or to obtain composite materials by the incorporation of filler materials therein prior to deposition.

The method of the present invention utilizes a variety of organo-metallic compounds, to yield mixtures of alumina and silica. It is also possible to obtain doped metal oxide coating components, such as chrome-ion doped alumina, yttria, and mixtures thereof, such as Yttria-Alumina-Garnet (YAG), $3Y_2O_3 \cdot 5Al_2O_3$. Further, while the present disclosure is specific to the preparation of sols which will yield coatings comprising alumina and silica, the addition of other oxides to either the alumina sol component or the silica sol component is to be considered within the scope of this invention. Also, while the specification speaks in terms of preparing sols of alumina and silica, it is intended that this terminology encompass those known sols of metals and compounds of metals which will yield metal oxides upon deposition and subsequent heating. It is also to be noted that while the sols are spoken of as being sols of alumina and silica, or other metallic oxides, it is intended that such language shall encompass sols in which the actual particulate materials are compounds of the specific metals which, after deposition, yield the oxide upon heating and/or sintering. Thus, while the specification may speak of an alumina sol, it is intended to encompass such sols as contain aluminum hydrate, which upon deposition and heat treatment will result in the formation of alumina per se.

The sols prepared by the present invention may be utilized to deposit coatings on a wide range of metallic substrates which are to be protected. The sols prepared by the present invention are particularly suitable for application of mixed oxide coatings to such materials as metal alloys commonly used in the fuel handling components of gas turbine engines. Such components may comprise such materials as titanium and titanium alloys, aluminum, stainless steels, and nickel base alloys such as Inconel and Waspaloy. In addition, the sols prepared by the present invention are also suitable for protection of surfaces of copper, zirconium, tantalum, chromium, cobalt, nickel, molybdenum, tungsten, rhenium, niobium, iron, and alloys thereof. Exemplary nonmetallic substrate materials include carbon, glass, silicon carbide, silicon nitride, alumina, various ceramics, and cermets.

In accordance with the present invention, organo-metallic compounds are hydrolyzed and peptized to obtain a sol having a colloidal particle size. Good contact of the mixed oxide coating materials prepared in accordance with the present invention is attained with the substrate, giving excellent adhesion, and excellent packing of the coating particles within the coating layer, is obtained, resulting in superior coating properties such as wear resistance, and thermal high temperature capability.

The process of the present invention comprises a method for preparation of sols for the express purpose of providing dense, highly adherent coatings. We have found that this may be achieved by the use of a process which differs from the prior art in that the alumina and silica components of the sol are prepared independently, in very specific proportions and order of addition. It has been found that if the components are mixed in any order other than as set forth hereinafter, a sol suitable for the deposition of mixed oxide coatings is not obtained. It is to be noted that the silica sol component has a relatively short shelf life, requiring that it be mixed with the alumina sol within a short period of time after preparation, up to about five days. However, once the alumina and silica sol components have been mixed, the shelf life of the coating mixture is quite long, e.g. three months or longer.

In general, the alumina sols of the present invention may be prepared by the hydrolysis and peptization of the corresponding organo-metallic compounds in an aqueous medium. Preferred organo-metallic compounds are aluminum alkoxides, and particularly the aluminum sec-butoxides, ethoxides, and methoxides. The silica sol components may be prepared from the corresponding silanes, such as tetramethoxysilane, tetrapropyloxysilane, and tetraethoxysilane.

The aqueous medium utilized in the preparation of the sols of the present invention comprises a solution of water, preferably deionized or distilled, and an organic solvent, such as an organic alcohol, aldehyde, or ketone. Suitable organic solvents include ethyl alcohol, methyl alcohol, isopropanol, butanol, and acetone. The organic solvent corresponding to the organo-component of the silane should be used in each instance for the preparation of the silica sol.

The peptizers utilized in the present invention may be selected from monovalent acids, such as hydrochloric, nitric, acetic, and formic acids, or inorganic acid forming salts such as aluminum nitrate. It is envisioned that the process of the present invention may also be successful using a basic peptizer rather than an acidic peptizer.

The hydrolysis, alcoholization, and peptizing procedure may be conducted at temperatures of from about 175° to about 210° F., preferably from about 190° to about 210° F., and most preferably at about 208° F., for the alumina sol. The silica sol may, in most instances, be prepared at ambient temperatures. The length of time for the reactions may be varied in accordance with the reaction temperatures and proportions of the components present in the hydrolysis/alcoholization/peptization mixture. Preferred times for the reaction and peptization are from a matter of seconds to weeks, but preferably between one minute and one week, and more preferably between 10 minutes and 24 hours.

The alcohol may be selected from methanol, ethanol, isopropanol, butanol, etc. Some surface charge effect variation is noted with variance of the alcohol used. In the preparation of aluminum hydrate sols, 2-butanol is the preferred alcohol. In the silica sol, ethyl alcohol is preferred, and in the mixture of the sols, methanol is preferred.

The specific ratios of water, alcohol, and organo-metallic compound to be used in preparation of the alumina and silica sols may be determined by one of ordinary skill in preparation of sols so as to prepare sols having the desired chemistry and particle size.

A mixed oxide sol may be prepared in the following manner, with particular attention being given to prevention of exposure of the reaction mixture to air. It is also critical that the given constituents be mixed in the specified order.

EXAMPLE 1

For the preparation of the alumina sol, a 4000 ml glass reaction vessel was assembled with a variable temperature heating mantel, a glass/TEFLON polytetrafluroethylene resin stirring rod with a laboratory mixer having variable speed control, an injection port with TEFLON tube for insertion of liquids to the bottom of the reaction vessel, and a water-cooled PYREX condenser. After turning on the flow of cooling water to the condenser, 2500 grams (corresponding to 138.8 moles or 2500 ml) of deionized water was metered into the closed reaction vessel, after which the heating mantel was turned on to raise the temperature of the water to between 190° F. and 210° F., which temperature was thereafter maintained. The mixer motor was turned on when the water had reached this temperature, and the water was vigorously stirred. In a separately sealable glass transfer container 345.7 grams (corresponding to 1.4 moles or 357.5 ml) of aluminum secbutoxide [$Al(OC_4H_9)_3$] was mixed with 288.86 grams (corresponding to 3.897 moles or 357.5 ml) of 2-butanol. Experience has taught that exposure of this mixture, or the aluminum sec-butoxide, to air for any longer than the absolute minimum necessary adversely affected the sol produced, so great care was exercised to avoid exposure. The mixture of sec-butoxide and 2-butanol, in the transfer container, was connected to the reaction vessel entry port after the water had reached the desired temperature, and very slowly, over a 5 minute period, metered directly down into the hot deionized water. When all of the mixture had been introduced into the water, the entry port was valved shut and the transfer container removed. The mixture of water, sec-butoxide, and 2-butanol was then permitted to hydrolyse and reflux for a period of 1 hour at temperature while stirring vigorously.

After 1 hour, and with the mixture still at temperature and being refluxed and stirred vigorously, the sol mixture was peptized by connecting a glass syringe containing 8.18 grams (0.224 moles or 6.875 ml) of hydrochloric acid to the vessel entry port. The entry valve was opened and the acid metered directly down into the sol mixture. The valve was then closed, and the syringe removed and refilled with air. The syringe was then reconnected to the entry port, and the air injected into the vessel to ensure that all of the acid had been introduced into the system. The valve was then closed, and the syringe removed.

The heating, stirring, and refluxing were maintained until the sol cleared, about 16 hours. The heat was then turned off and the stirrer and motor assembly removed. After the mixture cooled, the sol and alcohol separated, and the alcohol was removed by pipette. It was found that leaving a small amount of alcohol in the sol did not adversely affect the sol. The Ph of the sol was measured and found to be pH 3.90. This initial sol, comprising aluminum hydrate, was found to have a good shelf life, and could be stored prior to further processing. In the preparation of the alumina sol one may use from about 50 to about 400 moles of water, in combination with from about 1.0 to about 2.0 moles of aluminum organo-metallic compound, and from about 0.1 to about 0.5 moles of peptizer, and a vaporizable organic solvent. Preferably, one may use from about 100 to about 200 moles of water, from about 1.2 to about 1.6 moles of aluminum organo-metallic compound, and from about 0.2 to about 0.3 moles of peptizer. In the most preferred embodiment, as set forth by this example, one may use about 139 moles of water, 1.4 moles of aluminum organo-metallic compound, and about 0.22 moles of peptizer.

The silica sol component of the present invention was separately prepared by mixing, in a clean PYREX beaker, under a ventilated hood, 308.00 ml ethyl alcohol, and 18.00 ml deionized water. The mixture was vigorously shaken and stirred until well mixed. An aliquot of 55.57 ml tetraethoxysilane was then added to the mixture, and allowed to sit for at least five minutes after mixing. This mixture has a short shelf life before gelling, and is believed to comprise a sol of $SiO_2$ per se. In the preparation of the silica sol, one may use from about 0.5 to about 2 moles of water, from about 3 to about 10 moles of alcohol, and from about 0.1 to about 0.5 moles of silicon organo-metallic compound. Preferably, one may use from about 0.8 to about 1.2 moles of water, from about 4.8 to about 5.5 moles of alcohol, and from about 0.2 to about 0.3 moles of silicon organo-metallic compound. In the most preferred embodiment, as set forth by this example, one may use about 1 mole of water, about 5.27 moles of alcohol, and about 0.25 moles of silicon organo-metallic compound.

In a separate PYREX beaker, 114.68 ml of methyl alcohol and 6.45 ml of the above prepared silica sol were mixed well. To this mixture, 25.30 ml of the above prepared alumina hydrate sol was added, and the total mixture was well mixed. The final mixture has a long shelf life, and is ready for application to the appropriate substrate at this point. In the final mixture of the alumina and silica components, one may use from about 50 to about 500 moles of alcohol per mole of metal oxide forming material, preferably from 100 to 250 moles of alcohol per mole of metal oxide forming material, and most preferably from about 175 to 200 moles of alcohol per mole of metal oxide forming material. The alumina and silica sols should be combined so as to obtain a ratio of alumina to silica in the final coating composition of from about 10:1 to about 1:10, preferably from about 2:1 to about 1:2.

EXAMPLE 2

Coatings of a mixture of alumina and silica were applied to metallic test coupons by dip application, using two sets of four dips each with intermediate firings at 1112° F. in vacuum for five hours. Carbon deposition from the liquid phase, i.e. in flowing jet aviation fuel, with no boiling, was measured. The alumina-silica coated coupons were found to have considerably less carbon deposition on the surface thereof than uncoated coupons of the same metal subjected to the same fuel flow conditions.

The sol coating may be applied by various techniques familiar to one of skill in the coating arts, such as dipping, brush application, infiltration, spray, and immersion evaporation techniques.

It is to be understood that the above disclosure of the present invention is subject to considerable modification, change, and adaptation by those skilled in the art, and that such modifications, changes, and adaptations are to be considered to be within the scope of the present invention, which is set forth by the appended claims.

I claim:

1. A method for the preparation of a sol for the deposition of a coating comprising alumina and silica, said method consisting of:
   a. Preparing an alumina sol by combining from about 50 to about 400 moles of water, from about 1.0 to about 2.0 moles of aluminum organo-metallic compound, from about 0.1 to about 0.5 moles of acid peptizer, and a vaporizable carrier, at a temperature of from about 175° to about 210° F., for sufficient time to form a clear sol;
   b. Preparing a silica sol by combining from about 0.5 to about 2.0 moles of water, from about 3 to about 10 moles of alcohol, and from about 0.1 to about 0.5 moles of a silicon organo-metallic compound, for sufficient time to form a clear sol; and
   c. Combining the alumina sol and the silica sol to obtain an alumina-silica sol having a ratio of alumina to silica of from about 2:1 to about 1:2.

2. A method as set forth in claim 1, wherein the ratio of alumina to silica in the final sol is about 3:2.

3. A method as set forth in claim 1, wherein the aluminum organo-metallic compound is selected from the group consisting of aluminum sec-butoxides, ethoxides, and methoxides.

4. A method as set forth in claim 3, wherein the silicon organo-metallic compound is selected from the group consisting of tetramethoxysilane, tetrapropyloxysilane, and tetraethoxysilane.

5. A method as set forth in claim 4, wherein the aluminum organo-metallic compound is aluminum sec-butoxide.

6. A method as set forth in claim 5, wherein the silicon organo-metallic compound is tetraethoxysilane.

7. A method as set forth in claim 1, wherein the combined alumina sol and silica sol are suspended in an alcohol medium.

8. A method as set forth in claim 7, wherein the molar ratio of alcohol medium to alumina plus silica is from about 500:1 to about 50:1.

9. A method for the preparation of a sol for the deposition of a coating comprising alumina and silica, said method consisting of:
   a. Preparing an alumina sol by combining from about 100 to about 200 moles of water, from about 1.2 to about 1.6 moles of aluminum organo-metallic compound, from about 0.2 to about 0.3 moles of acid peptizer, and a vaporizable carrier, at a temperature of from about 190° to about 210° F., for sufficient time to form a clear sol;
   b. Preparing a silica sol by combining from about 0.8 to about 1.2 moles of water, from about 4.8 to about 5.5 moles of alcohol, and from about 0.2 to about 0.3 moles of a silicon organo-metallic compound, for sufficient time to form a clear sol; and
   c. Combining the alumina sol and the silica sol to obtain an alumina-silica sol having a ratio of alumina to silica of from about 2:1 to about 1:2.

10. A method as set forth in claim 9, wherein the ratio of alumina to silica in the final sol is from about 1.5:1 to 1:1.5.

11. A method as set forth in claim 9, wherein the aluminum organo-metallic compound is selected from the group consisting of aluminum sec-butoxides, ethoxides, and methoxides.

12. A method as set forth in claim 11, wherein the silicon organo-metallic compound is selected from the group consisting of tetramethoxysilane, tetrapropyloxysilane, and tetraethoxysilane.

13. A method as set forth in claim 12, wherein the aluminum organo-metallic compound is aluminum sec-butoxide.

14. A method as set forth in claim 13, wherein the silicon organo-metallic compound is tetraethoxysilane.

15. A method as set forth in claim 9, wherein the combined alumina sol and silica sol are suspended in an alcohol medium.

16. A method as set forth in claim 15, wherein the molar ratio of alcohol medium to alumina plus silica is from about 500:1 to about 50:1.

17. A method for the preparation of a sol for the deposition of a coating comprising alumina and silica, said method consisting of:
   a. Preparing an alumina sol by combining about 139 moles of water, about 1.4 moles of aluminum organo-metallic compound, about 0.22 moles of acid peptizer, and a vaporizable carrier, at a temperature of about 208° F., for sufficient time to form a clear sol;
   b. Preparing a silica sol by combining about 1 mole of water, about 5.27 moles of alcohol, and about 0.25 moles of a silicon organo-metallic compound, for sufficient time to form a clear sol; and
   c. Combining the alumina sol and the silica sol to obtain an alumina-silica sol having a ratio of alumina to silica of from about 1.5:1 to about 1:1.5.

18. A method as set forth in claim 17, wherein the ratio of alumina to silica in the final sol is about 3:2.

19. A method as set forth in claim 17, wherein the aluminum organo-metallic compound is selected from the group consisting of aluminum sec-butoxides, ethoxides, and methoxides.

20. A method as set forth in claim 19, wherein the silicon organo-metallic compound is selected from the group consisting of tetramethoxysilane, tetrapropyloxysilane, and tetraethoxysilane.

21. A method as set forth in claim 20, wherein the aluminum organo-metallic compound is aluminum sec-butoxide.

22. A method as set forth in claim 21, wherein the silicon organo-metallic compound is tetraethoxysilane.

23. A method as set forth in claim 17, wherein the combined alumina sol and silica sol are suspended in an alcohol medium.

24. A method as set forth in claim 23, wherein the molar ratio of alcohol medium to alumina plus silica is from about 500:1 to about 50:1.

* * * * *